US010090626B2

(12) United States Patent
Harwath et al.

(10) Patent No.: US 10,090,626 B2
(45) Date of Patent: Oct. 2, 2018

(54) METHOD AND APPARATUS FOR FORMING INTERFACE BETWEEN COAXIAL CABLE AND CONNECTOR

(71) Applicant: CommScope Technologies LLC, Hickory, NC (US)

(72) Inventors: Frank A. Harwath, Naperville, FL (US); Jeffrey D. Paynter, Momence, IL (US); James P. Fleming, Orland Park, IL (US); David J. Smentek, Lockport, IL (US)

(73) Assignee: CommScope Technologies LLC, Hickory, NC (US)

( * ) Notice: Subject to any disclaimer, the term of this patent is extended or adjusted under 35 U.S.C. 154(b) by 391 days.

(21) Appl. No.: 15/065,468

(22) Filed: Mar. 9, 2016

(65) Prior Publication Data
US 2016/0268754 A1    Sep. 15, 2016

Related U.S. Application Data

(60) Provisional application No. 62/131,105, filed on Mar. 10, 2015.

(51) Int. Cl.
*H01R 43/02*    (2006.01)
*B23K 3/08*    (2006.01)
(Continued)

(52) U.S. Cl.
CPC ......... *H01R 43/0263* (2013.01); *B23K 3/087* (2013.01); *B23K 3/0475* (2013.01);
(Continued)

(58) Field of Classification Search
CPC .......... H01R 4/023; H01R 4/024; H01R 9/05; H01R 43/02; H01R 43/0207;
(Continued)

(56) References Cited

U.S. PATENT DOCUMENTS 5,290,984 A  *  3/1994  Gerhard, Jr. ........... B23K 1/002
                                                    219/616
5,802,710 A       9/1998  Bufanda et al.
(Continued)

FOREIGN PATENT DOCUMENTS

KR       10-1450209       10/2014

OTHER PUBLICATIONS

International Search Report and Written Opinion for corresponding PCT Application No. PCT/US2016/021436, dated Jun. 17, 2016, 13 pages.
(Continued)

*Primary Examiner* — Peter DungBa Vo
*Assistant Examiner* — Joshua D Anderson
(74) *Attorney, Agent, or Firm* — Myers Bigel, P.A.

(57) ABSTRACT

A method of forming a solder joint between a coaxial cable and a coaxial connector includes the steps of: positioning a solder element between an end of an outer conductor of the coaxial cable and a connector body of the connector, wherein the solder element is positioned within a vacuum chamber; melting the solder element to form a solder joint between the outer conductor and the connector body, the solder joint including a lower surface formed by contact with a mounting structure; and applying suction to the melting solder element to reduce the formation of bubbles within the solder joint.

20 Claims, 4 Drawing Sheets

(51) Int. Cl.
    *B23K 3/047*    (2006.01)
    *H01R 9/05*    (2006.01)
(52) U.S. Cl.
    CPC ............ *H01R 9/05* (2013.01); *H01R 43/0235* (2013.01); *Y10T 29/49169* (2015.01); *Y10T 29/49179* (2015.01); *Y10T 29/53213* (2015.01)
(58) Field of Classification Search
    CPC ............ H01R 43/0242; H01R 43/0263; Y10T 29/49123; Y10T 29/49169; Y10T 29/49174; Y10T 29/49179; Y10T 29/53213; Y10T 29/53265; B23K 1/0002; B23K 1/0016; B23K 3/04; B23K 3/0475; B23K 3/087; B23K 2201/32; B23K 2201/38
    See application file for complete search history.

(56) References Cited

U.S. PATENT DOCUMENTS

| | | |
|---|---|---|
| 7,900,344 B2 | 3/2011 | Ng et al. |
| 2007/0170227 A1 | 7/2007 | Ohno et al. |
| 2009/0232594 A1 | 9/2009 | Ng et al. |
| 2014/0201989 A1 | 7/2014 | Paynter et al. |

OTHER PUBLICATIONS

Notification Concerning Transmittal of International Preliminary Report on Patentability corresponding to PCT Application No. PCT/US2016/021436, dated Sep. 21, 2017.

* cited by examiner

METHOD AND APPARATUS FOR FORMING INTERFACE BETWEEN COAXIAL CABLE AND CONNECTOR

RELATED APPLICATION

The present application claims priority from and the benefit of U.S. Provisional Patent Application No. 62/131,105, filed Mar. 10, 2015, the disclosure of which is hereby incorporated herein in its entirety.

FIELD OF THE INVENTION invention relates generally to a connector and cable interconnection, and more specifically to a connector and cable interconnection method and apparatus with improved manufacturing efficiency and electrical performance characteristics.

BACKGROUND OF THE INVENTION

Coaxial connectors are commonly utilized in RF communications systems. A typical coaxial cable includes an inner conductor, an outer conductor, a dielectric layer that separates the inner and outer conductors, and a jacket that covers the outer conductor. Coaxial cable connectors may be applied to terminate coaxial cables, for example, in communication systems requiring a high level of precision and reliability.

Coaxial connector interfaces provide a connect/disconnect functionality between a cable terminated with a connector bearing the desired connector interface and a corresponding connector with a mating connector interface mounted on an apparatus or on another cable. Typically, one connector will include a structure such as a pin or post connected to an inner conductor and an outer conductor connector body connected to the outer conductor; these are mated with a mating sleeve (for the pin or post of the inner conductor) and another outer conductor connector body of a second connector. Coaxial connector interfaces often utilize a threaded coupling nut or other retainer that draws the connector interface pair into secure electro-mechanical engagement when the coupling nut (which is captured by one of the connectors) is threaded onto the other connector.

Commonly-owned U.S. Pat. Nos. 5,802,710 and 7,900,344, hereby incorporated by reference in their entireties, disclose a technique for attaching a coaxial connector to a coaxial cable. The connector utilizes an insulating disc retained upon the inner contact and against the dielectric layer and outer conductor of the cable. Induction heating of a solder preform wrapped around the outer conductor creates a molten solder pool in a cylindrical solder cavity formed between the outer conductor, the insulating disc and the connector body. The insulating disc prevents the molten solder from migrating out of the cavity, fouling the connector bore and/or shorting the outer and inner conductors.

Commonly-owned U.S. Patent Publication No. 2014/0201989, also incorporated herein by reference in its entirety, illustrates a pedestal with an insulating seat on which the soldering of the outer conductor to the connector body can occur. One issue that can arise with this technique is the formation of air bubbles within the solder; if such bubbles form in locations along the signal path, the electrical performance of the connector interface can be compromised.

SUMMARY

As a first aspect, embodiments of the invention are directed to a method of forming a solder joint between a coaxial cable and a coaxial connector. The method comprises the steps of: positioning a solder element between an end of an outer conductor of the coaxial cable and a connector body of the connector, wherein the solder element is positioned within a vacuum chamber; melting the solder element to form a solder joint between the outer conductor and the connector body, the solder joint including a lower surface formed by contact with a mounting structure; and applying suction to the melting solder element to reduce the formation of bubbles within the solder joint.

As a second aspect, embodiments of the invention are directed to a method for attaching a connector to a coaxial cable, comprising the steps of: positioning a solder element between an end of an outer conductor of the coaxial cable and a connector body of the connector; positioning the connector body on a mounting structure; melting the solder element to form a solder joint between the outer conductor and the connector body, the solder joint including a surface formed by contact with the mounting structure, the melting step being performed as the solder element resides in a vacuum chamber; and applying suction to the melting solder element to reduce the formation of bubbles within the solder joint.

As a third aspect, embodiments of the invention are directed to an apparatus for forming a solder joint between a coaxial cable and a coaxial connector, comprising: a mounting structure with an upper surface configured to receive a connector body and a coaxial cable; a heating element positioned to melt a solder element to form a solder joint between the connector body and the coaxial cable, the upper surface of the mounting structure positioned to form the lower surface of the solder joint; a vacuum chamber; and a vacuum source attached to the vacuum chamber and positioned to apply suction to the solder joint as it forms between the connector body and the coaxial cable, the solder joint forming in the vacuum chamber.

DETAILED DESCRIPTION

The present invention is described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used in the above description is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

Figure 1:
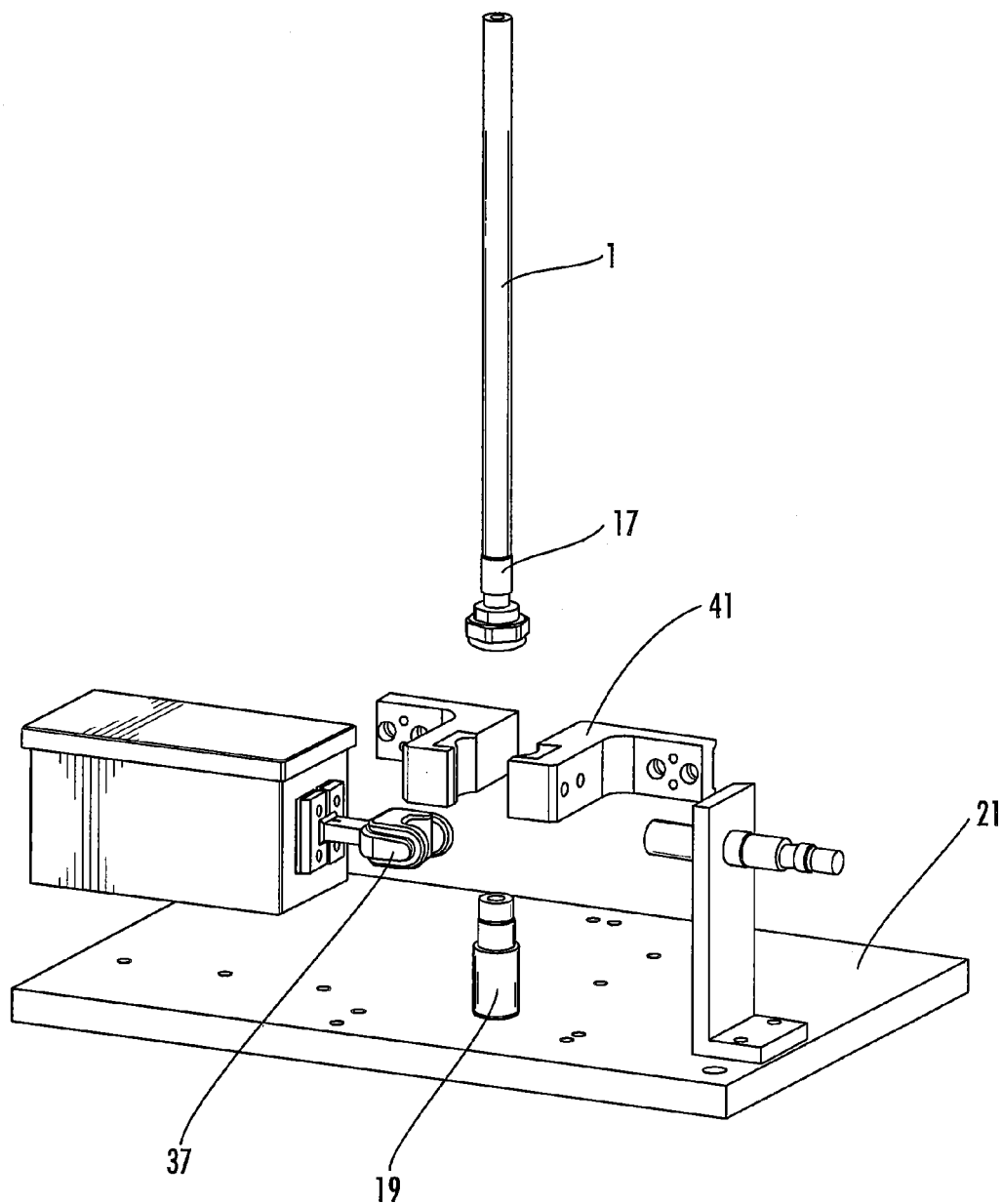
FIG. 1 is a schematic perspective view of a cable-connector assembly apparatus and a cable, wherein electrical interconnections, supporting and enclosure structures are removed for clarity.
Figure 2:
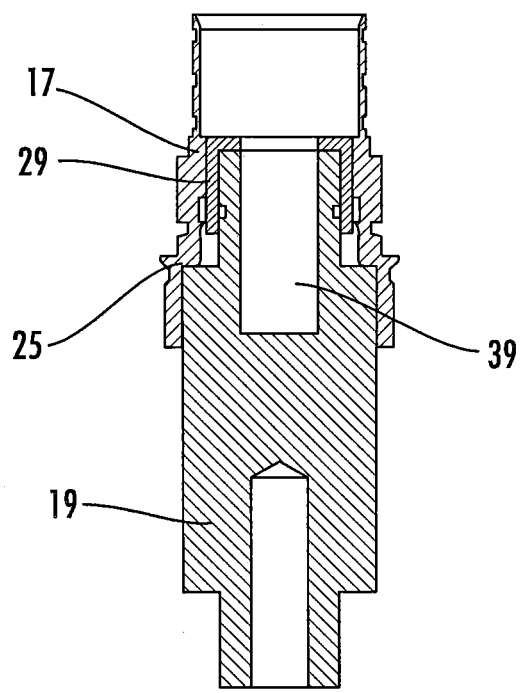
FIG. 2 is a schematic section view of a connector body seated upon the interface pedestal of the apparatus of FIG. 1.

Referring now to the figures, an apparatus for soldering a connector body onto a coaxial cable such as is described in U.S. Patent Publication No. 2014/0201989, supra, is shown in FIG. 1. The apparatus includes a pedestal 19 mounted on a base 21, a clamp 41 for holding a cable 1 in place, and an inductive heating element 37 for heating solder used to attach the connector body to the outer conductor of the cable 1. FIG. 2 shows a connector body 17 in place on the pedestal 19, with a step in the connector body 17 resting on a shoulder 25 of the pedestal 19. A cap 29, formed of a dielectric, thermally insulative material, is mounted on the upper end of the pedestal 19 to provide thermal insulation to components of the cable 1 during soldering. As a result, the pedestal 19 and cap 29 act as a mounting structure for the connector body 17. The pedestal 19 includes an inner conductor cavity 39 in its upper surface that is configured to receive the inner contact 11 of the cable 1 during soldering.

Figure 3:
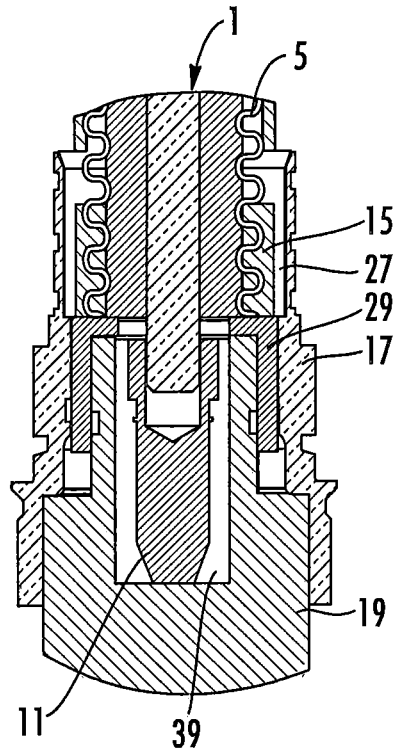
FIG. 3 is an enlarged section view of the pedestal and connector body of FIG. 2 with a cable and solder preform inserted therein for solder interconnection.
Figure 4:
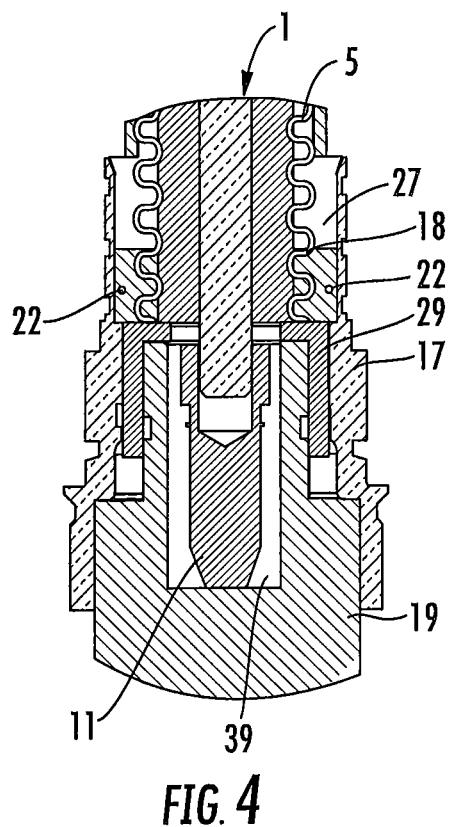
FIG. 4 is a section view as in FIG. 3 with the solder preform melted to form a solder joint.

As shown in FIG. 3, a solder preform 15 or other solder element circumscribes the end of the outer conductor 5 of the cable 1. The connector body 17 is positioned on the pedestal 19, with the solder cavity 27 of the connector body 17 (formed by the inner surface of the connector body 17, the upper surface of the cap 29, and the outer conductor 5) located above the pedestal 19. The cable 1 with the solder preform 15 in place is lowered into the cavity 27 and onto the pedestal 19, with the inner contact 11 of the cable 1 received in the inner conductor cavity 39, and the end of the outer conductor 5 and the solder preform 15 abutting the cap 29. The clamp 41 is applied to the connector body 17 to secure it in place. Heat is applied to the end of the cable 1 via the heating element 37, such that the solder preform 15 melts, flows downwardly within the solder cavity 27 between the inner surface of the connector body 17, the upper surface of the cap 29, and the outer conductor 5, and freezes, thereby forming a solder joint 18 between the outer conductor 5 and the connector body 17 (FIG. 4).

As described above, and as shown in FIG. 4, in many instances the flowing solder from the solder preform will create bubbles 22 that remain in the frozen solder joint 18. Such bubbles 22 can adversely impact the electrical performance of the interface between the outer conductor 5 and the connector body 17, particularly if the bubbles 22 are located in the electrical signal path.

Figure 5:
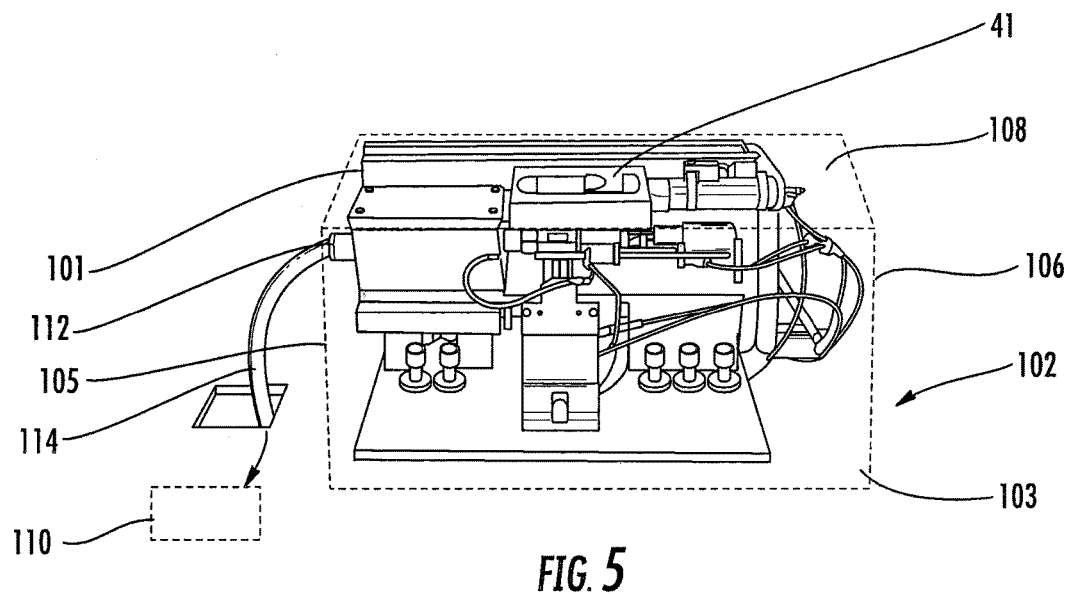
FIG. 5 is a front perspective view of an apparatus according to embodiments of the present invention, with the housing and the vacuum source illustrated schematically.
Figure 6:
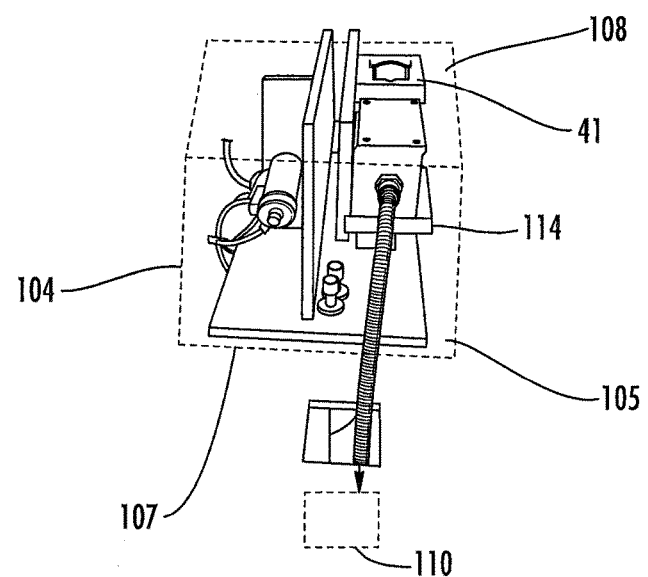
FIG. 6 is a side perspective view of the apparatus of FIG. 5.

Referring now to FIGS. 5 and 6, an apparatus for forming solder joints between coaxial connectors and coaxial cables is shown therein and designated broadly at 101. The apparatus 101 includes the component discussed above in connection with the apparatus of FIG. 1. However, the apparatus 101 is contained within an airtight housing 102 that enables a vacuum to be generated within the housing 102. As can be seen in FIGS. 5 and 6, the housing 102 includes a front wall 103, a rear wall 104, side walls 105, 106, a floor 107 and a ceiling 108.

A vacuum source 110 is located externally from the housing 102. Access to the interior of the housing 102 is available via a port 112 through which a hose 114 is routed. The port 112 is vacuum-sealed around the hose 114.

Also, as described above, the cable to be soldered is lowered into the pedestal 19 from above, and is clamped into place with the clamp 41. The clamp 41 also includes a gasket, O-ring or the like that forms a vacuum seal with the connector body 17 and/or the cable. The clamp 41 also includes a seal with the ceiling 108. As such, the interior of the housing 102 can be vacuum-sealed.

In operation, the cable with the connector body 17 is lowered onto the pedestal 19 as described above. The clamp 41 clamps the connector body 17, thereby forming a seal. The vacuum source 110 is activated, which draws a vacuum within the housing 102. The heating element 37 is activated, which causes the solder preform 15 to melt; once melted, the solder is allowed to freeze to form the solder joint 18. However, because the vacuum is present within the interior of the housing 102, the tendency for bubbles to form in the molten solder is reduced or eliminated, which in turn reduces or eliminates voids in the solder joint 18 that can negatively impact electrical performance.

The timing of the application of the vacuum may vary. In some embodiments, the vacuum may be activated prior to the application of heat via the heating element and maintained until the solder fully freezes. In other embodiments, the vacuum may be activated after the application of heat and maintained until freezing, and in other instances the vacuum may be deactivated prior to complete freezing of the solder joint 18.

Figure 7:
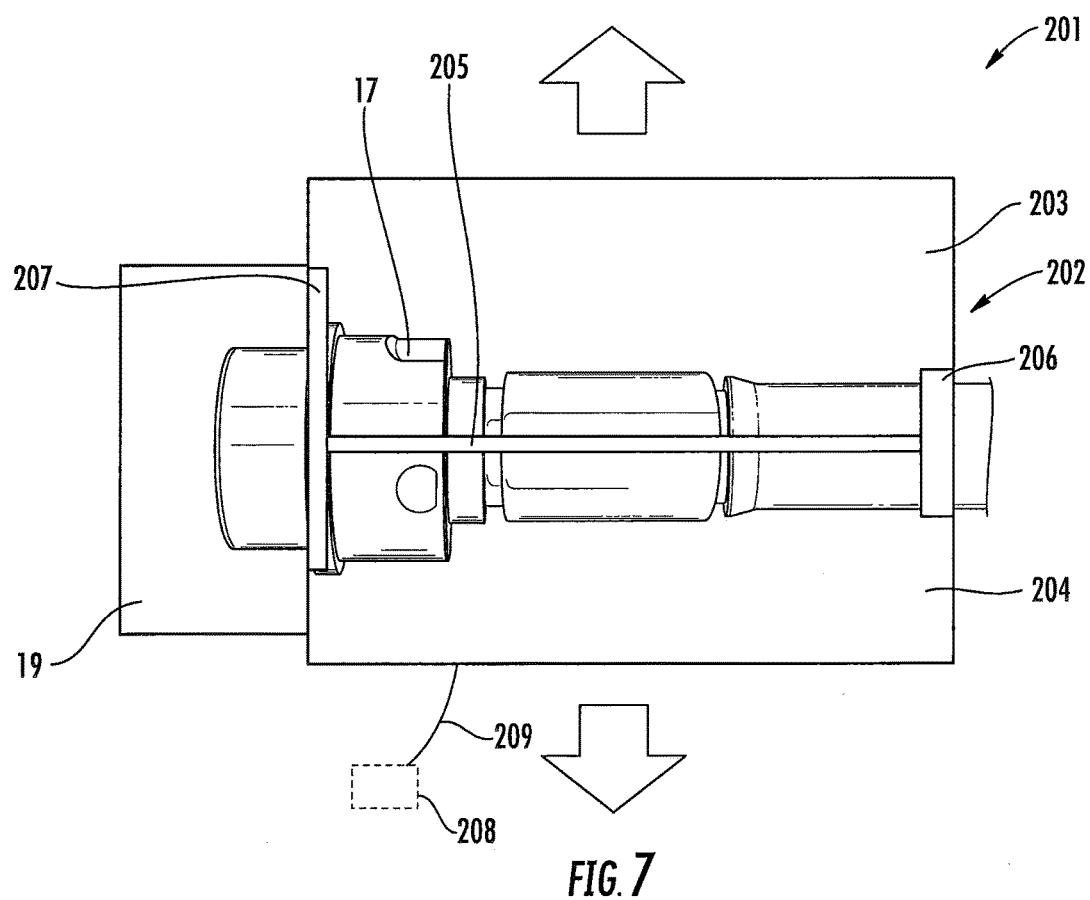
FIG. 7 is a schematic front view of an apparatus according to alternative embodiments of the invention.

Another apparatus directed to reducing the formation of voids in the solder joint is shown in FIG. 7 and designated broadly at 201. The apparatus 201 employs the components of the apparatus of FIG. 1, but also includes a small vacuum chamber 202 within which the connector body 17 resides during soldering. As shown in FIG. 7, the vacuum chamber 202 includes two halves 203, 204 that separate in a manner similar to a reciprocating mold. The meeting edges of the halves 203, 204 include a vacuum seal 205. The halves 203, 204 also include a vacuum seal 206 that forms around the cable and a seal 207 that forms with the pedestal 19. A vacuum source 208 is attached via a hose 209 to the half 204.

When a cable with a connector body 17 is mounted on the pedestal 19, the halves 203, 204 close around it to provide an airtight cavity in which soldering can occur, with the seals 205, 206, 207 preventing leakage at the interfaces between components. As described above, the vacuum source 208 can be activated to before or during the melting of the solder preform 15 to reduce or eliminate the formation of voids in the solder joint 18.

Those skilled in this art will appreciate that concepts discussed above may be applied to other soldering operations. For example, surface mount and direct launch bulkhead connectors for antennas and filters may be suitable for use with these concepts. Other variations may also be apparent.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A method of forming a solder joint between a coaxial cable and a coaxial connector, comprising the steps of:
    positioning a solder element between an end of an outer conductor of the coaxial cable and a connector body of the connector, wherein the solder element is positioned within a vacuum chamber;
    providing a mounting structure that allows for the positioning of the connector on the mounting structure such that the solder element abuts the mounting structure;
    melting the solder element to form a solder joint between the outer conductor and the connector body, the solder joint including a lower surface formed by contact with the mounting structure;
    applying suction to the melting solder element with the vacuum chamber to reduce the formation of bubbles within the solder joint; and
    after forming the solder joint between the outer conductor and the connector body, removing the connector from the mounting structure.

2. The method defined in claim 1, wherein the melting step comprises applying heat to the solder element with a heating element located inside the vacuum chamber.

3. The method defined in claim 2, wherein the mounting structure is located within the vacuum chamber.

4. The method defined in claim 1, wherein the melting step comprises applying heat to the solder element with a heating element located in a wall of the vacuum chamber.

5. The method defined in claim 4, wherein the vacuum chamber is configured to form a seal with the coaxial cable.

6. The method defined in claim 1, wherein the solder element is a solder preform mounted on the outer conductor of the cable.

7. The method defined in claim 1, wherein the mounting structure is an interface pedestal.

8. The method defined in claim 1, wherein the coaxial cable further comprises an inner conductor, and wherein an inner contact is mounted onto the inner conductor prior to the step of positioning the solder element, and wherein the mounting structure includes a cavity for receiving the inner contact.

9. A method for attaching a connector to a coaxial cable, comprising the steps of:
    positioning a solder element between an end of an outer conductor of the coaxial cable and a connector body of the connector;
    positioning the connector body on a mounting structure such that the solder element abuts the mounting structure;
    melting the solder element to form a solder joint between the outer conductor and the connector body, the solder joint including a surface formed by contact with the mounting structure, the melting step being performed as the solder element resides in a vacuum chamber; and
    applying suction to the melting solder element with the vacuum chamber to reduce the formation of bubbles within the solder joint; and
    after forming the solder joint between the outer conductor and the connector body, removing the connector from the mounting structure.

10. The method defined in claim 9, wherein the melting step comprises applying heat to the solder element with a heating element located inside the vacuum chamber.

11. The method defined in claim 10, wherein the mounting structure is located within the vacuum chamber.

12. The method defined in claim 9, wherein the melting step comprises applying heat to the solder element with a heating element located in a wall of the vacuum chamber.

13. The method defined in claim 12, wherein the vacuum chamber is configured to form a seal with the coaxial cable.

14. The method defined in claim 9, wherein the solder element is a solder preform mounted on the outer conductor of the cable.

15. The method defined in claim 9, wherein the mounting structure is an interface pedestal.

16. The method defined in claim 9, wherein the coaxial cable further comprises an inner conductor, and wherein an inner contact is mounted onto the inner conductor prior to the step of positioning the connector body, and wherein the mounting structure includes a cavity for receiving the inner contact.

17. An apparatus for forming a solder joint between a coaxial cable and a coaxial connector, comprising:
    a mounting structure with an upper surface configured to receive a connector body and a coaxial cable;
    a heating element positioned to melt a solder element positioned between an end of an outer conductor of the coaxial cable and the connector body of the connector to form a solder joint between the connector body and the coaxial cable, the upper surface of the mounting structure positioned to form a lower surface of the solder joint;
    a vacuum chamber; and
    a vacuum source attached to the vacuum chamber and positioned to apply suction to the solder joint as it forms between the connector body and the coaxial cable, the solder joint forming in the vacuum chamber.

18. The apparatus defined in claim 17, wherein the heating element is located inside the vacuum chamber.

19. The apparatus defined in claim 18, wherein the mounting structure is located within the vacuum chamber.

20. The apparatus defined in claim 17, wherein the heating element is located in a wall of the vacuum chamber.

* * * * *